(12) United States Patent
Tsukahara et al.

(10) Patent No.: US 10,253,866 B2
(45) Date of Patent: Apr. 9, 2019

(54) DRIVING FORCE TRANSMISSION MECHANISM AND IMAGE FORMING APPARATUS

(71) Applicant: CANON KABUSHIKI KAISHA, Tokyo (JP)

(72) Inventors: Takeshi Tsukahara, Suntou-gun (JP); Hideyuki Matsubara, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 14/812,268

(22) Filed: Jul. 29, 2015

(65) Prior Publication Data

US 2016/0033026 A1 Feb. 4, 2016

(30) Foreign Application Priority Data

Jul. 31, 2014 (JP) .................................. 2014-156727

(51) Int. Cl.
  *F16H 55/17* (2006.01)
  *F16H 57/00* (2012.01)
(52) U.S. Cl.
  CPC ......... *F16H 57/0031* (2013.01); *F16H 55/17* (2013.01)
(58) Field of Classification Search
  CPC ............................ F16H 57/0031; F16H 55/17
  See application file for complete search history.

(56) References Cited

U.S. PATENT DOCUMENTS

| 5,862,706 A * | 1/1999 | Chen ......................... F16H 1/48 384/536 |
| 6,813,971 B2 * | 11/2004 | Hagiwara ............... F16H 55/17 416/60 |
| 6,885,837 B2 | 4/2005 | Matsubara |
| 2005/0028630 A1 * | 2/2005 | Hagihara ................. B41J 23/02 74/458 |
| 2005/0081668 A1 * | 4/2005 | Hagihara .................. F16H 1/08 74/458 |
| 2007/0147895 A1 | 6/2007 | Hayakawa |
| 2012/0210813 A1 * | 8/2012 | Zeller ..................... F16H 55/17 74/431 |

(Continued)

FOREIGN PATENT DOCUMENTS

| JP | 52-127979 | 9/1977 |
| JP | 0611016 A | 1/1994 |
| JP | 2000-205383 A | 7/2000 |

(Continued)

OTHER PUBLICATIONS

Japanese Office Action issued in corresponding Japanese Application No. 2014-156727 dated May 1, 2018.

*Primary Examiner* — David M Fenstermacher
(74) *Attorney, Agent, or Firm* — Venable LLP

(57) ABSTRACT

A drive transmission mechanism includes a rotatable member provided with a drive transmitting portion; and a shaft supporting the rotatable member; wherein the shaft has a large diameter portion, a small diameter portion having a diameter smaller than that of the large diameter portion, at least one middle diameter portion having a diameter smaller than that of the large diameter portion and larger than that of the small diameter portion, and a stepped portion at a boundary between the small diameter portion and the middle diameter portion.

16 Claims, 8 Drawing Sheets

(56) References Cited

U.S. PATENT DOCUMENTS

2012/0325036 A1* 12/2012 Harada ............... B21J 5/12
74/424.86
2013/0104682 A1* 5/2013 Schneider ............ F16H 1/20
74/421 A

FOREIGN PATENT DOCUMENTS

| JP | 2007178606 A | 7/2007 |
|---|---|---|
| JP | 2008-75872 A | 4/2008 |
| JP | 2010065794 A | 3/2010 |
| JP | 2015-4377 A | 1/2015 |

* cited by examiner

DRIVING FORCE TRANSMISSION MECHANISM AND IMAGE FORMING APPARATUS

FIELD OF THE INVENTION AND RELATED ART

The present invention relates to a driving force transmission mechanism having gears, etc., and an image forming apparatus equipped with the above described driving force transmission mechanism.

Rotational members having a driving force transmitting section comprising gears, etc., have been used as a driving force transmission mechanism in various fields. They have been known to have such a structure that a gear 121 is rotatably fitted around a straight shaft 122, being thereby supported by the shaft 122, as shown in FIG. 8. In recent years, in response to the increased desire to reduce an image forming apparatus in electric power consumption, it has come to be desired to reduce a driving force transmission mechanism such as the above-described one in the amount of driving force transmission loss attributable to rotational members such as gears. Some of the causes of the driving force transmission loss, which occurs to driving force transmission mechanisms such as the one shown in FIG. 8, is the loss attributable to the friction, which occurs to the driving force transmitting section 121*a* of the gear 121, and the friction which occurs between the shaft 121 and gear 121. Thus, it has been widely known to apply lubricant between the peripheral surface of the shaft 122 and the shaft contacting portion 121*b* of the gear 121, and the driving force transmission section 121*a*, in order to minimize these losses. However, the application of lubricant causes driving force transmission loss attributable to the phenomenon that lubricant increases in viscosity as the ambient temperature falls. Thus, various proposals have been made to deal with these losses. One of the proposals is disclosed in Japanese Laid-open Patent Application 2008-75872. According to this application, in order to reduce the driving force transmission loss, the area of contact between the gear 121 and shaft 122, and between the gear 121 and the other components other than the shaft 122, are coated with lubricant to reduce the driving force transmission loss attributable to the force necessary to shear the lubricant in the above described area of contact.

However, conventional driving force transmission mechanism such as the above-described one suffer from the problem that they cannot reduce the driving force transmission loss attributable to the thrust load.

SUMMARY OF THE INVENTION

Thus, the primary object of the present invention is to provide such a driving force transmission mechanism that is significantly smaller in the driving force transmission loss attributable to the thrust load than any of conventional driving force transmission mechanisms.

According to an aspect of the present invention, there is provided a drive transmission mechanism comprising a rotatable member provided with a drive transmitting portion; and a shaft supporting said rotatable member; wherein said shaft has a large diameter portion, a small diameter portion having a diameter smaller than that of said large diameter portion, at least one middle diameter portion having a diameter smaller than that of said large diameter portion and larger than that of said small diameter portion, and a stepped portion at a boundary between said small diameter portion and said middle diameter portion.

Further features of the present invention will become apparent from the following description of exemplary embodiments with reference to the attached drawings.

DESCRIPTION OF THE EMBODIMENTS

Hereinafter, a few of the preferred embodiments of the present invention are described with reference to the appended drawings. However, the following embodiments of the present invention are not intended to limit the present invention in terms of the dimension, material, and shape of each of the structural components of a driving force transmission mechanism, and an image forming apparatus equipped with a driving force transmission mechanism in invention, and the positional relationship among the structural components. That is, they are to be modified as necessary according to the structure of an apparatus to which the present invention is applied, and various conditions under which the apparatus is used. In other words, the following embodiments are not intended to limit the present invention in scope unless specifically noted.

Embodiment 1

Figure 1:
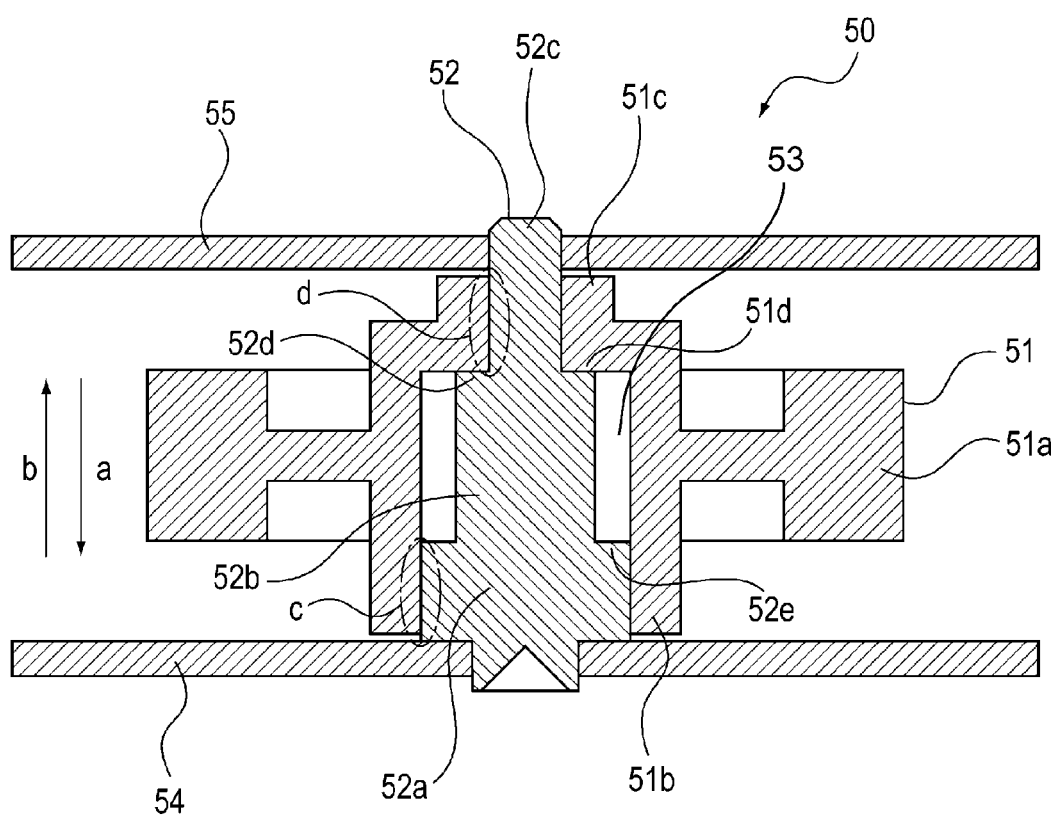
FIG. 1 is a sectional view of the driving force transmission mechanism in the first embodiment of the present invention.
Figure 2:
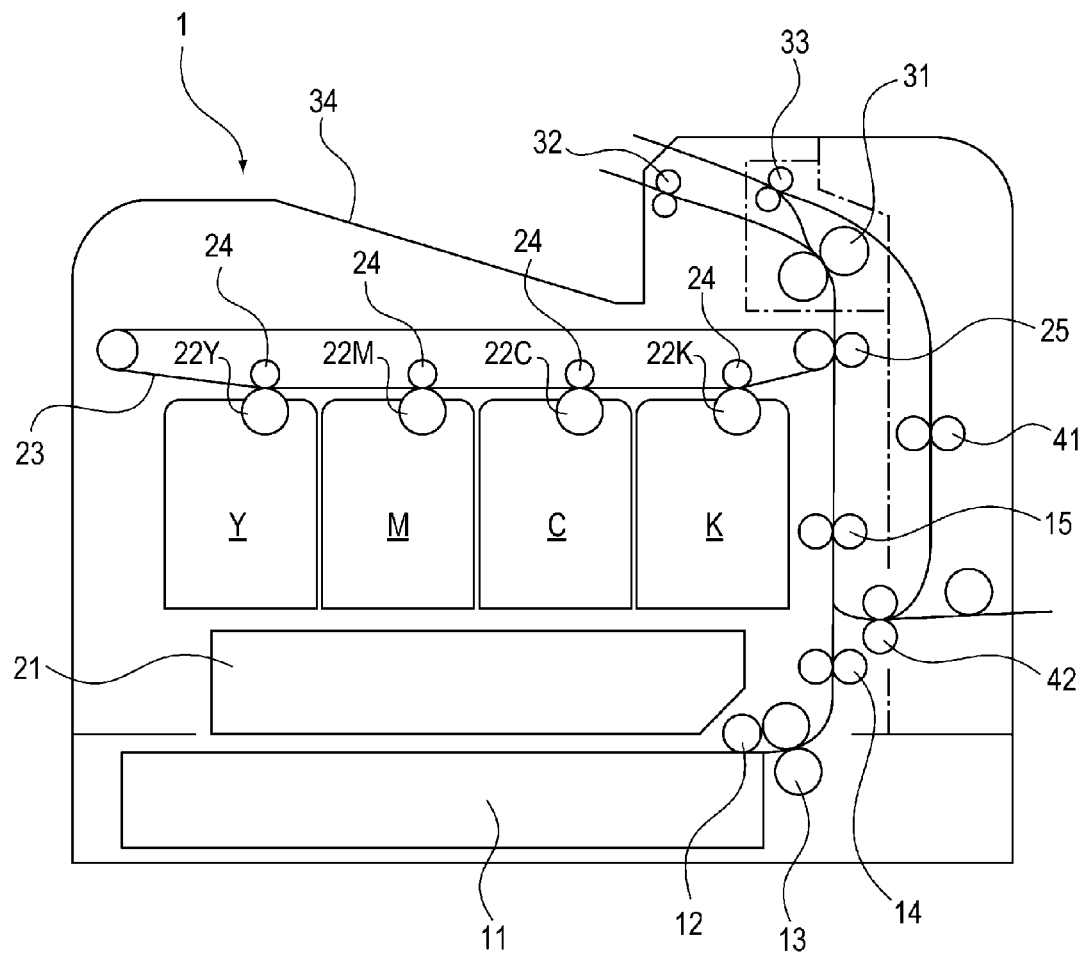
FIG. 2 is a schematic sectional view of the image forming apparatus equipped with a driving force transmission mechanism or a driving force transmitting device, in the first embodiment, and shows the general structure of the apparatus.

Next, the first embodiment of the present invention is described with reference to FIGS. 1-6. FIG. 1 is a sectional view of the driving force transmission mechanism in the first embodiment, and FIG. 2 is a sectional view of the image forming apparatus equipped with the driving force transmission mechanism, in the first embodiment. It shows the general structure of the apparatus. FIGS. 3-6 are sectional views of modified versions of the driving force transmission mechanisms, one for one, in the first embodiment.

To begin with, referring to FIG. 2, the overall structure of the image forming apparatus equipped with a driving force transmission mechanism is roughly described. The image forming apparatus 1 shown in FIG. 2 is structured, as a color laser printer, so that a cassette 11 in which sheets of recording medium are storable in layers can be removably installed in the bottom portion of the main assembly of the image forming apparatus 1. The sheets of recording medium in the cassette 11 are fed one by one into the main assembly of the image forming apparatus 1 by a combination of a pickup roller 12 and a pair of conveyance rollers 13, starting from the topmost sheet. As the topmost sheet is fed into the main assembly of the image forming apparatus 1, it is conveyed to a secondary transfer roller 25 by a combination of a pair of conveyance rollers 14 and a pair of conveyance rollers 15. The pair of conveyance rollers 15 have the function of registering each sheet P.

Regarding the image forming apparatus 1, its image forming section which forms an image on a sheet of recording medium is made up of four process cartridges, which are removably installable in the main assembly of the image forming apparatus 1, and which are for forming Y (yellow), M (magenta), C (cyan) and K (black) monochromatic images, respectively, listing from the left side of FIG. 2. Referring to FIG. 2, referential codes Y, M, C and K stand for yellow, magenta, cyan and black, respectively. However, in the following description of the preferred embodiments of the present invention, these referential codes are not shown unless it is necessary to mention the color to which each component, image, etc., are related.

Next, regarding the image forming method of this image forming apparatus 1, a beam of laser light is projected upon the peripheral surface of the photosensitive drum 22 in each process cartridge, from a scanner 21, while being modulated according to the information regarding the image to be formed. Thus, an electrostatic latent image is formed on the peripheral surface of the photosensitive drum 22. This electrostatic latent image is developed with toner, into a toner image, that is, an image formed of toner, in the developing section (unshown) in the process cartridge. Then, the four toner images, different in color, on the four photosensitive drums 1, one for one, are sequentially transferred (primary transfer) in layers onto an intermediary transfer belt 23 by the application of bias to a primary transfer roller 24. The four monochromatic toner images, which are different in color and layered on the intermediary transfer belt 23, are conveyed to the secondary transferring section, in which they are transferred together (secondary transfer) onto a sheet of recording medium, by the secondary transfer roller 25.

After the secondary transfer of the toner images onto a sheet of recording medium, the sheet is conveyed to a fixation roller 31 in a fixing device, while bearing the toner images. Then, it is conveyed through the fixing device. While the sheet is conveyed through the fixing device, the sheet and the toner images thereon are subjected to heat and pressure, whereby the toner images are fixed to the sheet. When the image forming apparatus 1 is on the one side printing mode, the sheet is discharged into a delivery tray 34, which is outside the main assembly of the image forming apparatus 1, by a pair of discharge rollers 32, right after the fixation of the toner images to the sheet.

On the other hand, when the image forming apparatus 1 is in the two-sided printing mode, the sheet is reversed in the direction of its movement by a pair of reverse rotation rollers 33, after the fixation. Then, the sheet is conveyed for the second time to the pair of conveyance rollers 15 by a combination of a pair of conveyance rollers 41 and a pair of conveyance rollers 42. Then, an image is formed on the back (second) surface of the sheet through the same procedure as that through which an image was formed on the front (first) side of the sheet. Then, the sheet is discharged into the delivery tray 34.

The driving force transmission mechanism structure in accordance with the present invention is applicable to a driving force transmission mechanism for driving rotational members such as the combination of the pickup roller 12 and conveyance rollers 13, as a recording medium feeding means, the combination of pair of conveyance rollers 14, pair of conveyance rollers 15, pair of conveyance rollers 33, and pair of conveyance rollers 42, as conveying means, pair of discharge rollers 32, etc., as discharging means. Further, it is also applicable to the driving force transmission mechanism for driving rotational members such as the photosensitive drum 22 of each image forming section, primary transfer roller 24, and secondary transfer roller 25, and the driving force transmission mechanism for driving the rotational members such as the fixation roller 31 in the fixing device. Moreover, it can be applied to the driving force transmission mechanism for driving the driving section in the image forming apparatus 1.

Next, referring to FIG. 1, the structure of the driving force transmission mechanism in the first embodiment is described in detail.

The driving force transmission mechanism 50 is made up of a gear 51 as a rotational member, a shaft 52 which rotatably supports the gear 51, a side plate 54 to which the shaft 52 is fixed, and a side plate 55 which is at the opposite end of the shaft 52 from the side plate 54 and prevents the gear 51 from becoming disengaged.

The gear 51 is molded of a substance such as polyacetal which is excellent in that a component formed of it is low in surface friction. It has: a driving force transmitting section 51a; a section 51b which is large in internal diameter and by which the gear 51 is supported by the shaft 52; a section 51c which is small in internal diameter and by which gear 51 is supported by the shaft 52; and a step section 51d between the peripheral surface of the abovementioned large internal diameter section 51b and the peripheral surface of the abovementioned small internal diameter section 51c.

The shaft 52 is formed of a high strength structural material which is excellent in that components formed thereof are low in surface friction. For example, it may be formed of stainless steel, or may be formed of free cutting steel and then, plated. The shaft 52 is made up of a large diameter section 52a, a medium diameter section 52b, and a small diameter section 52c, listing from the side of the side plate 54 to which the shaft 52 is fixed. Referring to FIG. 1, the small diameter section 52c is smaller in external diameter than the large diameter section 52a. The medium diameter section 52b which is between the large diameter section 52a and small diameter section 52c is smaller in external diameter than the large diameter section 52a, and is larger in external diameter than the small diameter section 52c. Further, there is a large step section 52e between the peripheral surface of the large diameter section 52a and the peripheral surface of the medium diameter section 52b, and a small step section 52d between the peripheral surface of the medium diameter section 52b and that of the small step 52d. The shaft 52 is fixed to the side plate 54. The side plate 55 is provided with a hole, in which the small diameter section 52c is fitted. That is, the small diameter section 52c is supported by the side plate 55.

Since the driving force transmission mechanism 50 is structured as described above, a force (which hereafter may be referred to as "radial load") which is applied to the gear 51 in the direction perpendicular to the shaft 52 is borne by the large diameter section 52a and small diameter section 52c, which contact the large internal diameter section 51b and small internal diameter section 51c, respectively, of the shaft 51. As for the force (which hereafter will be referred to as "thrust load") which is generated in a case where the gear 51 is a helical gear, if it is downwardly directed (indicated by arrow mark a in FIG. 1) in terms of the direction parallel to the shaft 52, it is borne by the small step section 52d which comes into contact with the step section 51d of the gear 51. On the other hand, if the above described thrust load is directed upward (indicated by arrow mark b in FIG. 1) in terms of the direction parallel to the shaft, it is borne by the side plate 55.

Also referring to FIG. 1, the driving force transmission mechanism 50 is structured so that the large internal diameter section 51b and the medium diameter section 52b of the shaft 52 do not come into contact with each other, there is a space 53 where the gear 51 and shaft 52 do not contact with each other. For the purpose of minimizing the friction between the gear 51 and shaft 52, and also, minimizing the frictional wear of the gear 51 and shaft 52, lubricant is applied to the large diameter section 52a (area c in FIG. 1) of the shaft 52, and small diameter section 52c (area d in FIG. 1) of the shaft 52. With the provision of the small step section 52d and large step section 52e, it is possible to provide the space 53, which can provide a gap which is greater than a preset value, between the peripheral surface of the medium diameter section 52b and the inward surface of the large internal diameter section 51b.

In this embodiment, in order to reduce the driving force transmission mechanism 50 in transmission loss, the gear supporting section is reduced in diameter, and the areas of contact between the shaft 52 and gear 51, that is, the areas to which lubricant is applied, are reduced in size. Next, the means for the reduction is described.

The effect of the reduction in the diameter of the first gear supporting section is that the reduction reduces the torque loss, provided that the resistance to which the supporting section such as the shaft is subjected remains the same. That is, the smaller the first gear supporting section in diameter, the smaller the amount of torque loss.

In this embodiment, the driving force transmission mechanism 50 is structured so that in order to reduce it in torque loss, one half of the radial load which occurs as driving force is transmitted with the use of the gear 51 is borne by the small diameter section 52c. Moreover, in this embodiment, the shaft 52 is provided with the medium diameter section 52b so that the small diameter section 52c can be minimized in length. For example, even if the shaft 52 is reduced in diameter as small as 2 mm, the driving force transmission mechanism 50 remains sufficiently strong. In addition, this structural arrangement makes it easier to mass-produce a header, and the like.

Further, in this embodiment, the driving force transmission mechanism 50 is structured so that even if the thrust load is generated, it is borne by the small diameter section 52c. That is, in a case where the thrust load is generated downward (indicated by arrow mark a in FIG. 1) in terms of the direction parallel to the shaft 52, the force is borne by the small step section 52d which is smallest in diameter, whereas in a case where the thrust load is generated upward (indicated by arrow mark b in FIG. 1) in terms of the direction parallel to the shaft 52, it is borne by the side plate 55, and the surface of the small internal diameter section 51c, by which the small internal diameter section 51c contacts (slides on) the side plate 55. Therefore, even if thrust load is generated, it is borne by the small diameter section 52c. Therefore, the torque loss attributable to the thrust load is minimized.

Further, as for the effect of the reduction in the size of the second area of contact between the gear 51 and shaft 52, the driving force transmission loss attributable to the shearing of the lubricant can be reduced by reducing the area of contact in size.

In this embodiment, the space 53 is provided between the inward surface of the large internal diameter section 51b of the gear 51, and the peripheral surface of the medium diameter section 52b of the shaft 52. Thus, the driving force transmission mechanism 50 in this embodiment is smaller in the total area of contact between gear 51 and shaft 52, being therefore smaller in the friction which occurs as the gear 51 rotates about the shaft 52, than any of conventional driving force transmission mechanisms.

Moreover, in this embodiment, the areas to be coated with lubricant are clearly defined. Therefore, it is unlikely to occur that an excessive amount of lubricant oozes into the space 53. Thus, it is unlikely to occur that the driving force transmission mechanism is reduced in transmission efficiency because the driving force is partially consumed to shear the lubricant in the space 53. Further, the driving force transmission mechanism 50 can be optimized in the amount by which lubricant is applied to the areas of contact. That is, it does not occur that lubricant is wastefully used.

Figure 3:
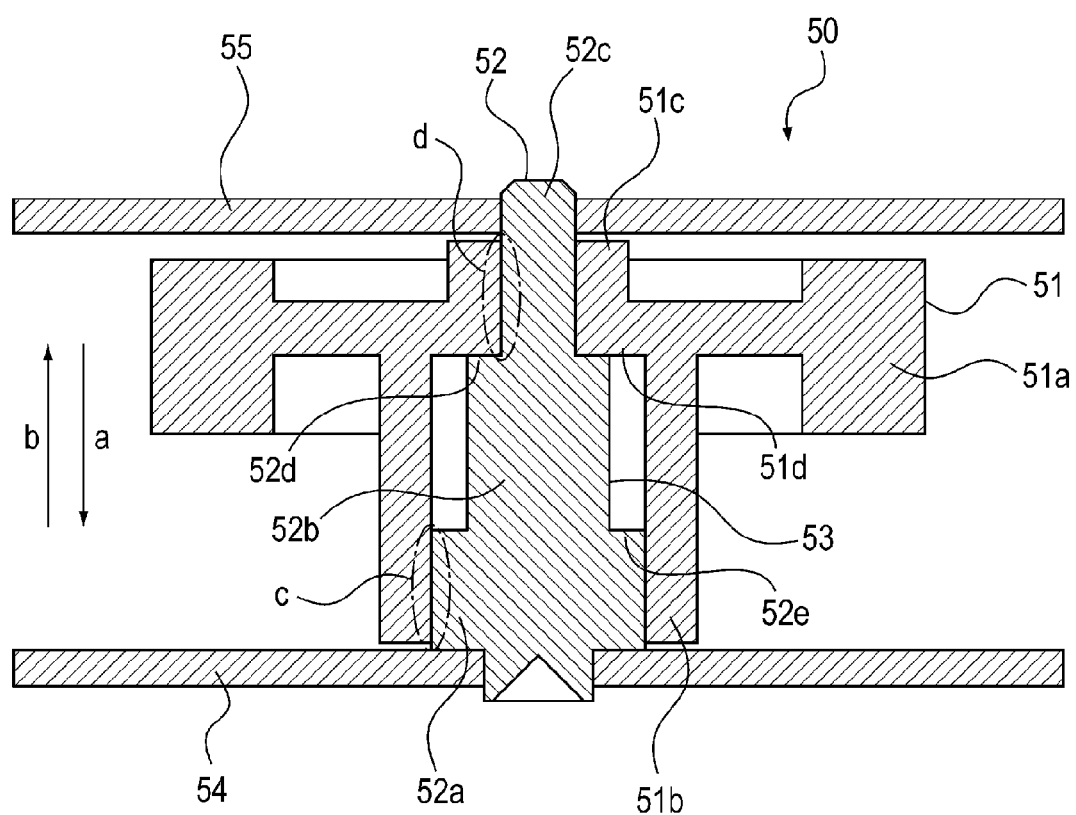
FIG. 3 is a sectional view of a modified version of the driving force transmission mechanism in the first embodiment.
Figure 4:
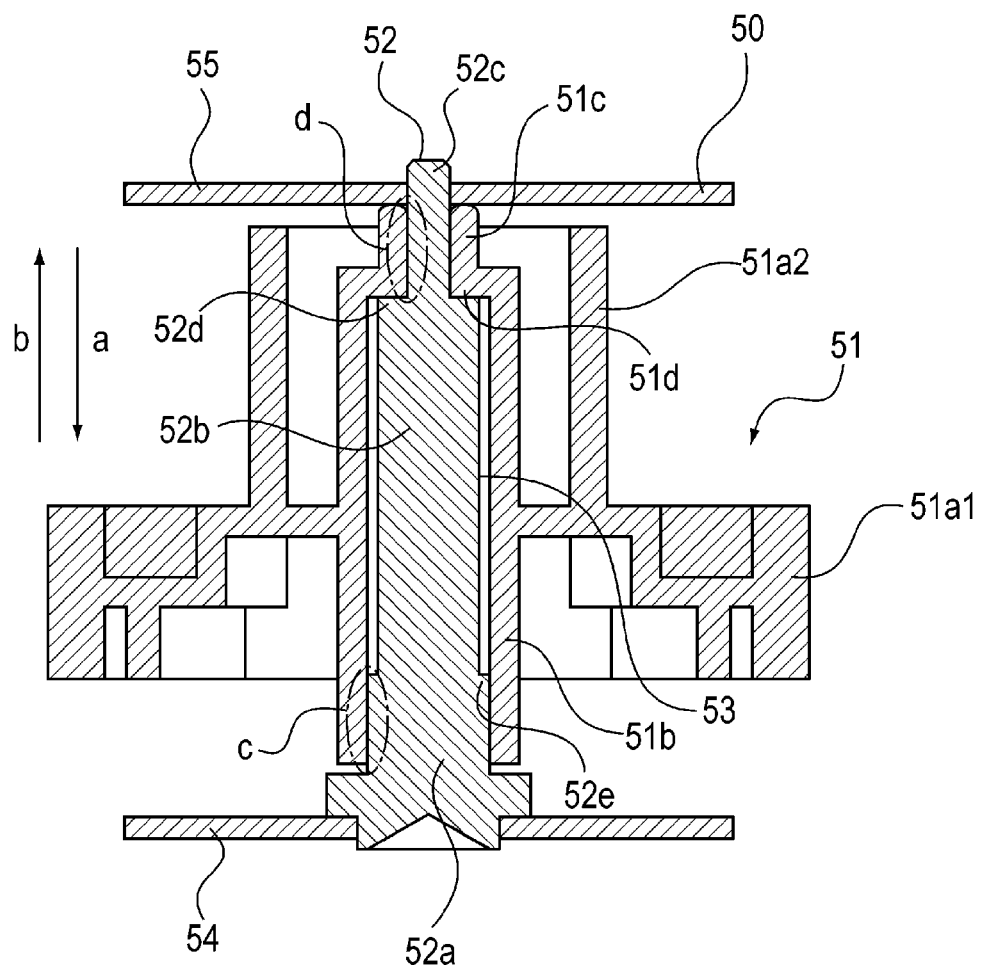
FIG. 4 is a sectional view of another modified version of the driving force transmission mechanism in the first embodiment.

Next, referring to FIG. 3, a case where the driving force transmitting section 51a of the gear 51 is offset toward one (55 in this case) of the side plates is described. It is desired that the driving force transmitting section 51a of the gear 51 is on the small diameter side (small diameter section 52c) of the shaft 52, as shown in FIG. 3. With the driving force transmission mechanism 50 structured as shown in FIG. 3, it is possible for the small diameter section 52c of the shaft 52 to bear the major portion of the radial load which occurs as the driving force is transmitted. Therefore, it is possible to further reduce the torque loss.

Figure 9:
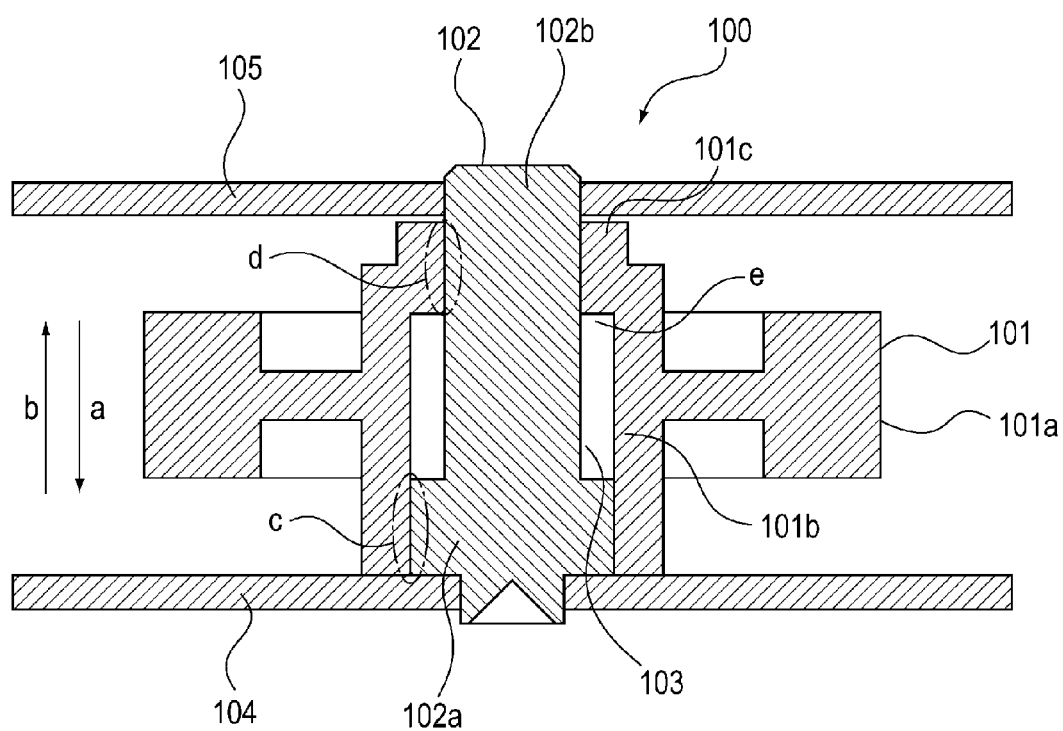
FIG. 9 is a sectional view of an example of comparative driving force transmission mechanism.

FIG. 9 is a drawing for describing an example of a comparative driving force transmission mechanism 100. The comparative driving force transmission mechanism 100 shown in FIG. 9 is problematic in that it cannot reduce the driving force transmission loss attributable to the thrust load. In a case where force is generated downward in the direction parallel to the shaft 52 (as indicated by arrow mark a in FIG. 9), the gear 51 catches this force by its large internal diameter section 101b, more specifically, the portion of the large internal diameter section, which is in contact with the side plate 104. Therefore, the torque loss is large; the comparative driving force transmission mechanism 100 is inferior in terms of the driving force transmission loss attributable to the thrust load.

Further, the comparative driving force transmission mechanism 100 suffers from the problem attributable to excessive lubricant application. That is, the area d (FIG. 9) of the small diameter section 102b of the shaft 102, to which lubricant is to be applied, is not clearly defined. Therefore, it is likely to occur that lubricant is applied by an unnecessarily large amount. Moreover, as driving force is transmitted, it is partially consumed to shear the excessive amount of lubricant (in area e in FIG. 9), worsening thereby the driving force transmission loss.

Further, in this embodiment, the gear 51 was a single-stage gear having only one driving force transmission section (51*a*). However, the present invention is also applicable to a driving force transmission mechanism which employs a multistage gear, such as the one, shown in FIG. 4, which has two driving force transmitting sections 51*a*1 and 51*a*2.

Figure 5:
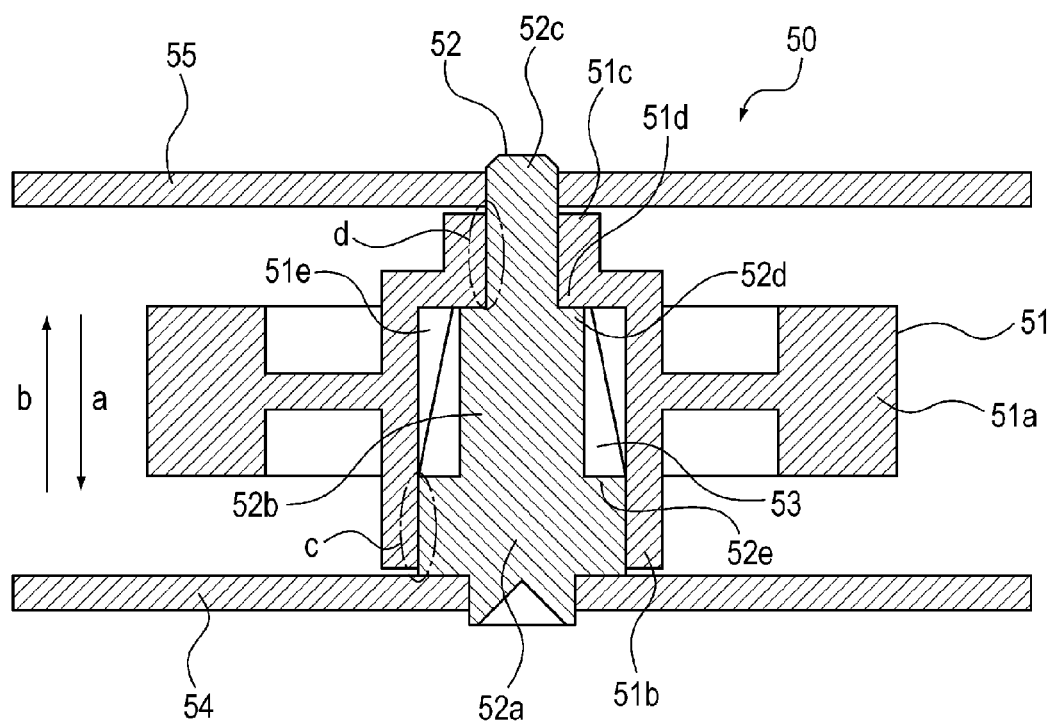
FIG. 5 is a sectional view of another modified version of the driving force transmission mechanism in the first embodiment.
Figure 6:
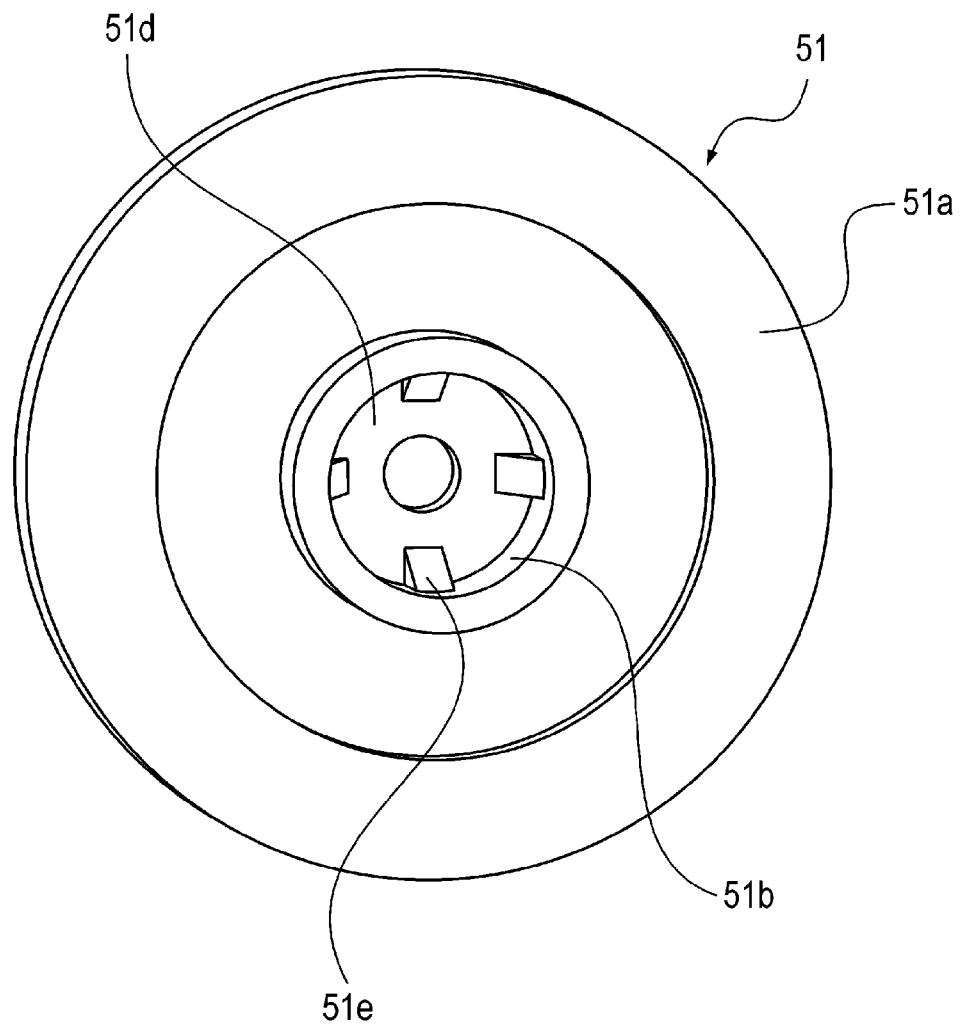
FIG. 6 is a perspective view of a gear, which is one of the structural components of one of modified versions of the driving force transmission mechanism in the first embodiment.

Next, a structural arrangement for further improving a driving force transmission mechanism is described with reference to FIGS. 5 and 6. In the case of the driving force transmission mechanism 50 shown in FIG. 6, the large internal diameter section 51*b* of the gear 51 is provided with ribs 51*e*. Since the large internal diameter section 51*b* is provided with the ribs 51*e*, it is greater in strength (rigidity), being therefore enabled to better resist such force that acts to bend the gear 51. Thus, it is better ensured that each of the teeth (of driving force transmitting section 51*a*) of the gear 51 remains properly meshed with its counterpart, and also, that the gear 51 properly (smoothly) rotates about the shaft 52. Therefore, the driving force transmission mechanism 50 is improved in driving force transmission efficiency. By the way, in this embodiment, the large internal diameter section 51*b* was provided with four ribs 51*e*. However, the rib count does not need to be four. That is, as long as the large internal diameter section 51*b* is provided with one or more ribs 51*e*, the large internal diameter section 51*b* of the gear 51 is improved in strength. Further, it is not mandatory that the ribs 51*e* are triangular in cross-section as shown in FIG. 9. For example, they may be square, rectangular, parallelepipedic, etc., in cross-section. In other words, the shape does not matter.

The driving force transmission mechanism 50 in this embodiment is structured and made to function, as described above. Therefore, it is substantially smaller in the amount of the driving force transmission loss, which is attributable to the radial load and thrust load, and also, the force consumed to shear the excessive amount of lubricant, than any of conventional driving force transmission mechanisms.

Embodiment 2

Figure 7:
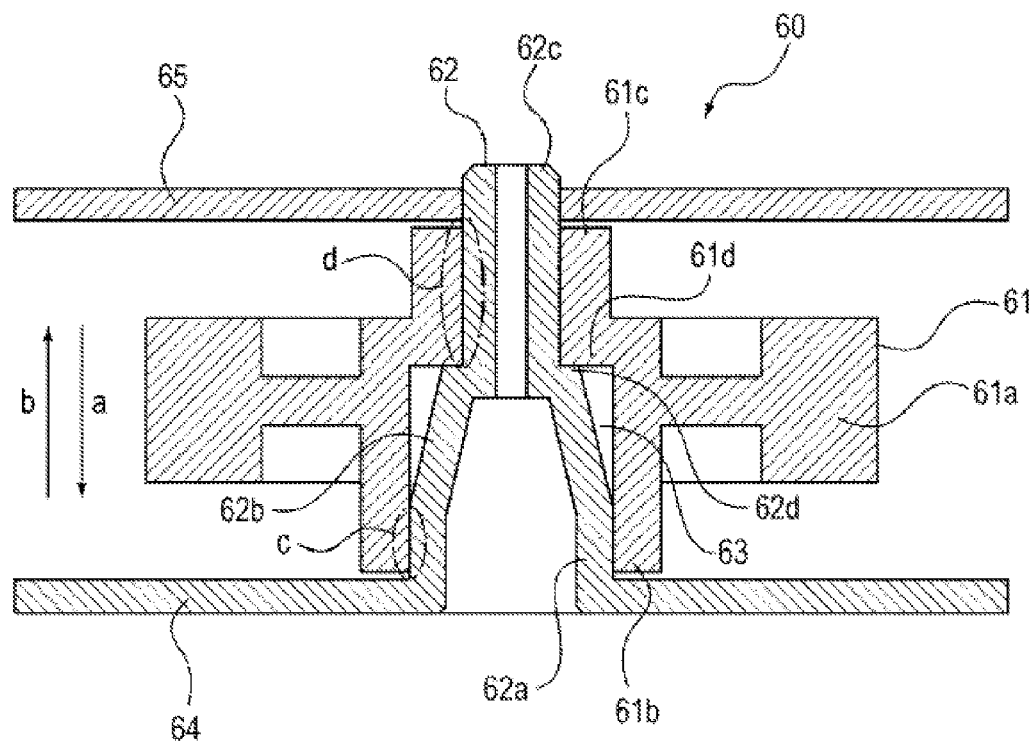
FIG. 7 is a sectional view of the driving force transmission mechanism in the second embodiment of the present invention.
Figure 8:
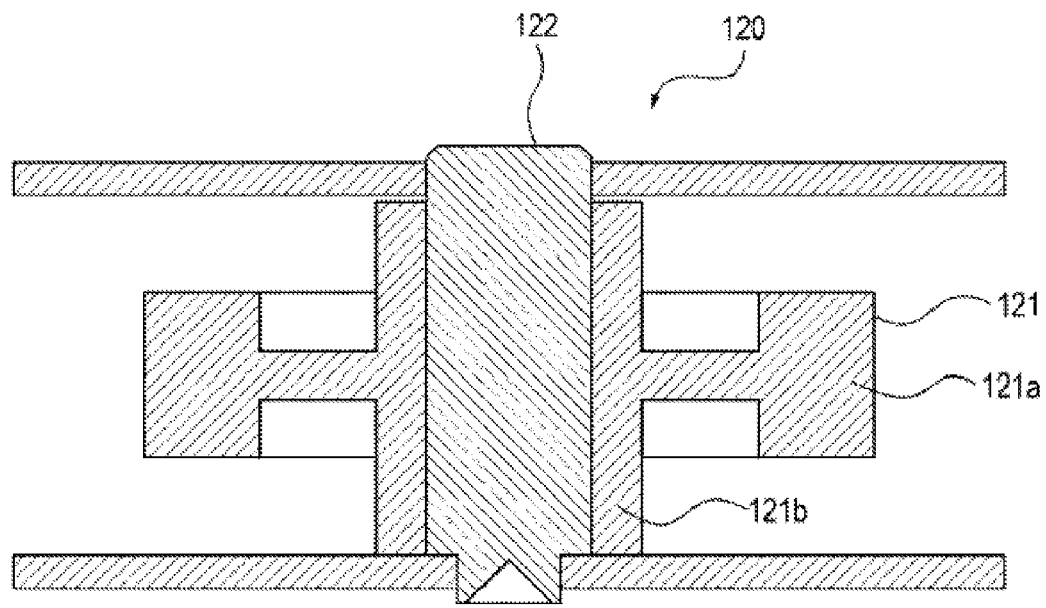
FIG. 8 is a sectional view of an example of conventional driving force transmission mechanisms.

Next, referring to FIG. 7, the second embodiment of the present invention is described. FIG. 7 is a sectional view of the driving force transmission mechanism 60 in the second embodiment.

The driving force transmission mechanism 60 shown in FIG. 7 is made up of a gear 61, a shaft 62 by which the gear 61 is rotatably supported, a side plate 64 which is integral with the shaft 62, and a side plate 65 which functions as a component to prevent the gear 61 from becoming disengaged.

The gear 61 is molded of a substance such as polyacetal which is excellent in that a component formed of it is low in surface friction. It is made up of a driving force transmitting section 61*a*, a large internal diameter section 61*b* by which it is supported by the shaft 62, a small internal diameter section 61*c* by which it is supported by the shaft 62, and an internal step section 61*d* which is between the inward surface of the large internal diameter section 61*b* and small internal diameter section 61*c*.

The shaft 62 is integral with the side plate 64. It is formed of ABS, PBT, or the like, which is excellent in that a component formed of it is strong and low in surface friction. The shaft 62 has a large diameter section 62*a*, a medium diameter section 62*b*, and a small diameter section 62*c*, listing from the side of the side plate 64. The medium diameter section 62*b* is tapered. Further, there is a small step section 62*d* between the medium diameter section 62*b* and small diameter section 62*c*. The shaft 62 is supported by the side plate 65; the small diameter section 62*c* of the shaft 62 is inserted in the hole with which the side plate 65 is provided.

Regarding the areas of the gear 61, by which the gear 61 is supported by the shaft 62, the gear 61 is supported by the shaft 62, by the area c (in FIG. 7) of its large internal diameter section 61*b*, which contacts the large diameter section 62*a* of the shaft 62, and the area d (in FIG. 7) of its small diameter section 62*c*, which contacts the small diameter section 62*c* of the shaft 62. In terms of the direction parallel to the axial line of the gear 61, the area d of the gear 61 by which the gear 61 is supported by the small diameter section 62*c* of the shaft 62, is longer than the area c of the gear 61 by which the gear 61 is supported by its large diameter section 62*a*. Therefore, the driving force transmission mechanism 60 in this embodiment is smaller in the torque loss than the driving force transmission mechanism 50 in the first embodiment.

The radial load to which the gear 61 is subjected is borne by the large diameter section 62*a* and small diameter section 62*c* of the shaft 62. Regarding the thrust load which occurs in a case where the gear 61 is a helical gear, in a case where the thrust load generated downward (indicated by arrow mark a in FIG. 7) in terms of the direction parallel to the axial line of the shaft 62, it is borne by the small step section 62*d* of the shaft 62, whereas in a case where it is generated upward (indicated by arrow mark b in FIG. 7) in terms of the direction parallel to the axial line of the shaft 62, it is borne by the side plate 65. Since the shaft 62 in this embodiment is provided with the tapered medium diameter section 62*b*, it is easier to mass-produce by injection molding.

Further, the driving force transmission mechanism 60 in this embodiment is structured so that the large internal diameter section 61*b* of the gear 61 does not contact the medium diameter section 62*b* of the shaft 62. That is, the driving force transmission mechanism 60 is provided with a space 63.

Next, the function of the driving force transmission mechanism 60 in this embodiment is described.

In this embodiment, the thrust load which occurs as driving force is transmitted by the gear 61 is borne by the large diameter section 62*a* and small diameter section 62*c* of the shaft 62. In terms of the direction parallel to the axial line of the shaft 62, the area d (in FIG. 7) of the small diameter section 62*c*, which bears the radial load, is longer than the area c (in FIG. 7) of the large diameter section 62*a*. Therefore, the driving force transmission mechanism 60 in this embodiment is smaller in torque loss than the driving force transmission mechanism 50 in the first embodiment.

In this embodiment, in a case where the thrust load is generated downward in terms of the direction (indicated by arrow mark a in FIG. 7) parallel to the axial line of the shaft 62, it is borne by the small step section 62*d*, whereas in a case where the it is generated upward in terms of the direction (indicated by arrow mark b in FIG. 7) parallel to the axial line of the shaft 62, it is borne by the side plate 65 (and surface of small internal diameter section 61*c*, which contacts side plate 65). Thus, even if friction is generated by the thrust load, the torque loss attributable to the friction is minimized.

In this embodiment, the driving force transmission mechanism 60 is provided with a space 63 which is between the gear 61 and shaft 62, and in which the gear 61 does not contact the shaft 62. Thus, it is significantly smaller in the area of contact between the gear 61 and shaft 62 than any of conventional driving force transmission mechanisms. Therefore, it is significantly smaller in the driving force transmission loss attributable to the shearing of lubricant than any of conventional driving force transmission mechanisms.

Moreover, in this embodiment, the areas of the driving force transmission mechanism 60, which are to be coated with lubricant, are clearly defined. Therefore, it is unlikely to occur that the excessive amount of lubricant oozes into the space 63. Therefore, it is unlikely to occur that the lubricant is sheared in the space 63, making it unlikely to occur that the driving force is partially consumed to shear the lubricant in the space 63. Further, because the driving force transmission mechanism 60 is optimized in the amount of lubricant, it does not occur that lubricant is wastefully used.

In this embodiment, even if the shaft 62 is formed of resin, the same effects as those obtainable by the first embodiment can be obtained. Moreover, regarding the torque loss attributable to the radial load, the amount by which the radial load is borne by the small diameter section 62c in this embodiment is greater than that in the first embodiment. Therefore, this embodiment is significantly smaller in the amount of torque loss than the first embodiment.

In the above-described embodiments of the present invention, the image forming apparatus was a printer. However, these embodiments are not intended to limit the present invention in scope. That is, the present invention is also applicable to image forming apparatuses other than the apparatus in the preceding embodiments. For example, it is applicable to a copying machine, a facsimile machine, and the like. It is also applicable to a multifunction image forming apparatus capable of performing a combination of two or more functions of various single-function image forming apparatuses. The effects similar to those obtained by the preceding embodiments can also be obtained by applying the present invention to the driving force transmission mechanism employed by the image forming apparatuses other than those in the preceding embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156727 filed on Jul. 31, 2014, which is hereby incorporated by reference herein in its entirety.

What is claimed is:

1. A drive transmission mechanism comprising:
   a rotatable member provided with a drive transmitting portion, said rotatable member having a large inner diameter portion and a small inner diameter portion having an inner diameter smaller than that of said large inner diameter portion; and
   a shaft supporting said rotatable member, said shaft having (i) a large diameter portion, (ii) a small diameter portion having a diameter smaller than that of said large diameter portion, (iii) at least one middle diameter portion having a diameter smaller than that of said large diameter portion and larger than that of said small diameter portion, and (iv) a stepped portion at a boundary between said small diameter portion and said middle diameter portion,
   wherein said large inner diameter portion of said rotatable member contacts said large diameter portion of said shaft and said small inner diameter portion of said rotatable member contacts said small diameter portion of said shaft, and
   wherein a non-contact space between said middle diameter portion of said shaft and said large inner diameter portion of rotatable member is formed in a direction perpendicular to said shaft.

2. A drive transmission mechanism according to claim 1, wherein said large diameter portion and said small diameter portion of said shaft receive a force applied by said rotatable member in a direction perpendicular to an axis of said shaft, and said stepped portion receives a force applied by said rotatable member in a direction of the axis of said shaft.

3. A drive transmission mechanism according to claim 2, wherein said drive transmitting portion of said rotatable member is disposed adjacent to said small diameter portion with respect to the direction of the axis of said shaft.

4. A drive transmission mechanism according to claim 1, wherein said large inner diameter portion of said rotatable member slidably contacts said large diameter portion of said shaft, and
   wherein said small inner diameter portion said rotatable member slidably contacts said small diameter portion of said shaft.

5. A drive transmission mechanism according to Claim 1, wherein said large inner diameter portion of said rotatable member is provided with a rib and said middle diameter portion of said shaft and said rib form the non-contact space.

6. A drive transmission mechanism according to claim 1, wherein said middle diameter portion of said shaft is tapered.

7. A drive transmission mechanism according to claim 1, wherein a support region of said small inner diameter portion contacting said small diameter portion of said shaft is longer in the direction of an axis of said shaft than a support region of said large inner diameter portion contacting said large diameter portion of said shaft.

8. A drive transmission mechanism according to claim 1, wherein said stepped portion of said shaft faces an inner portion of said rotatable member in a direction parallel to said shaft.

9. An image forming apparatus comprising:
   a drive transmission mechanism configured to transmit a driving force, said drive transmission mechanism including;
   a rotatable member provided with a drive transmitting portion, said rotatable member having a large inner diameter portion and a small inner diameter portion having an inner diameter smaller than that of said large inner diameter portion; and
   a shaft supporting said rotatable member, said shaft having (i) a large diameter portion, (ii) a small diameter portion having a diameter smaller than that of said large diameter portion, (iii) at least one middle diameter portion having a diameter smaller than that of said large diameter portion and larger than that of said small diameter portion, and (iv) a stepped portion at a boundary between said small diameter portion and said middle diameter portion,
   wherein said large inner diameter portion of said rotatable member contacts said large diameter portion of said shaft and said small inner diameter portion of said rotatable member contacts said small diameter portion of said shaft, and
   wherein a non-contact space between said middle diameter portion of said shaft and said large inner diameter portion of rotatable member is formed in a direction perpendicular to said shaft.

10. An apparatus according to claim 9, wherein said stepped portion of said shaft faces an inner portion of said rotatable member in a direction parallel to said shaft.

11. An apparatus according to claim 9, wherein said large inner diameter portion of said rotatable member slidably contacts said large diameter portion of said shaft, and
wherein said small inner diameter portion of said rotatable member slidably contacts said small diameter portion of said shaft.

12. An apparatus according to claim 9, wherein said large inner diameter portion of said rotatable member is provided with a rib and said middle diameter portion of said shaft and said rib form the non-contact space.

13. An apparatus according to claim 8, wherein said middle diameter portion of said shaft is tapered.

14. An apparatus according to claim 9, wherein a support region of said small inner diameter portion contacting said small diameter portion of said shaft is longer than a support region of said large inner diameter portion contacting said large diameter portion of said shaft in the direction of an axis of said shaft.

15. An apparatus according to claim 9, wherein said large diameter portion and said small diameter portion of said shaft receive a force applied by said rotatable member in a direction perpendicular to an axis of said shaft, and said stepped portion receives a force applied by said rotatable member in a direction of the axis of said shaft.

16. An apparatus according to claim 15, wherein said drive transmitting portion of said rotatable member is disposed adjacent to said small diameter portion with respect to the direction of the axis of said shaft.

* * * * *